United States Patent [19]

Needham et al.

[11] Patent Number: 4,589,734
[45] Date of Patent: May 20, 1986

[54] POLYCHROMATIC LIQUID CRYSTAL DISPLAY WITH REFLECTIVE ELECTRODE PADS

[75] Inventors: Barbara Needham; Peter W. Ross, both of Bishops Stortford, England

[73] Assignee: International Standard Electric Corporation, New York, N.Y.

[21] Appl. No.: 499,036

[22] Filed: May 27, 1983

[30] Foreign Application Priority Data

Jun. 15, 1982 [GB] United Kingdom ............... 8217331
Sep. 2, 1982 [GB] United Kingdom ............... 8225191

[51] Int. Cl.⁴ .................................................. G02F 1/13
[52] U.S. Cl. .................................. 350/336; 350/333; 350/338; 350/346; 350/349
[58] Field of Search .............. 350/339 F, 338, 336, 350/333, 349, 346

[56] References Cited

U.S. PATENT DOCUMENTS

| 3,865,469 | 2/1975 | Asai et al. | 350/349 |
| 4,006,968 | 2/1977 | Ernstoff et al. | 350/339 F |
| 4,396,251 | 8/1983 | Mukoh et al. | 350/339 F X |
| 4,403,216 | 9/1983 | Yokoi | 350/339 F X |

FOREIGN PATENT DOCUMENTS

| 56-25714 | 3/1981 | Japan | 350/339 F |
| 57-30883 | 2/1982 | Japan | 350/336 |
| 2066545A | 7/1981 | United Kingdom | 350/349 |
| 2077476A | 12/1981 | United Kingdom . | |
| 2079022A | 1/1982 | United Kingdom . | |

OTHER PUBLICATIONS

"A Liquid Crystal Multicolor Display Using Color Filters", by Tatsuo Uchida, Proceedings of the First European Display Research Conference, 1981, pp. 39–42.

Primary Examiner—John K. Corbin
Assistant Examiner—Richard F. Gallivan
Attorney, Agent, or Firm—T. L. Peterson; J. M. May

[57] ABSTRACT

The array of electrodes of an active silicon backed matrix addressed liquid crystal cell incorporating a black guest dye arranged in groups whose individual members exhibit contrasting colors, typically, red, blue, green and optionally yellow, whereby a polychromatic image can be displayed.

5 Claims, 1 Drawing Figure

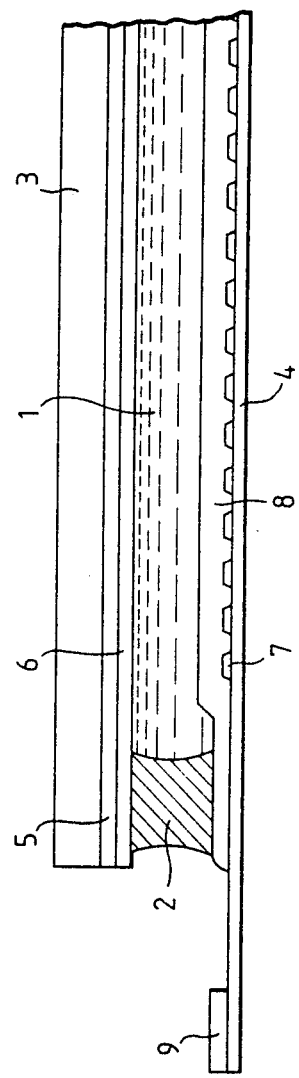

POLYCHROMATIC LIQUID CRYSTAL DISPLAY WITH REFLECTIVE ELECTRODE PADS

BACKGROUND OF THE INVENTION

This invention relates to matrix array addressed liquid crystal display devices capable of displaying polychromatic images.

In specifications of our British patent applications Nos. 8117927 (Ser. No. 2079022A), claiming priority from 8020040 (Ser. No. 2078421A), 8020074 (Ser. No. 2078422A), 8200217 and 8209708 we have described black-and-white type matrix addressed liquid crystal display devices based on the use of a dyed nematic or dyed cholesteric nematic phase change electro-optic display mode layer backed by an active semiconductor wafer by which the layer is addressed. This invention is particularly concerned with an adaptation of this general type of display so as to enable polychromatic images to be displayed.

SUMMARY OF THE INVENTION

According to the present invention there is provided a liquid crystal display device having a liquid crystal layer incorporating a substantially black guest dye sandwiched between an electroded transparent front sheet and a rear sheet formed by or carrying a semiconductive layer provided with access circuitry by which the display is addressed on a line-by-line basis via a matrix array of semiconductor gates directly or indirectly connected with an overlying matrix array of liquid crystal electrode pads of a range of contrasting colors colored by pigment incorporated in the surface of the pads themselves or in a layer covering the pads, the pads being arranged such that each picture element of the display is associated with an equivalent group of pads including at least one member of each one of the range of colors.

Several different electro-optic liquid crystal effects involving dichroic dyes are possible for a display cell having its liquid crystal layer backed by an active silicon wafer. These include the dyed nematic without front polarizer, the dyed nematic with front polarizer, and the dyed cholesteric-nematic phase change modes of operation. The dyed nematic without front polarizer suffers from the disadvantage that, although the brightness is good, the contrast is poor. This is because only one of the two principal planes of polarization of light through the crystal is subject to absorption by the dye, and thus about half the light is transmitted unchanged. Dyed nematics using a single front polarizer avoid this problem by filtering out the mode of propagation that is not attenuated by the dye. This gives an excellent contrast ratio, but a heavy penalty is paid in terms of brightness due to the absorption of light in the polarizer. For this reason dyed nematic displays with a front polarizer can look excellent in transmitted light, but reflected light displays only appear to be attractive in situations where there is strong front illumination. The conventional dyed phase change display avoids both these particular problems, but exhibits hysteresis in its switching which makes it difficult to reproduce gray-scales. For this reason, if a gray-scale representation facility is required, it is generally preferred to use a dyed nematic without front polarizer but with chiral additive. The amount of chiral additive in this instance is more than is typically used in a dyed nematic for the purpose of shortening the switching time and optionally for the purpose of avoiding the problems of reverse twist. On the other hand, it is less than that typically used in a conventional phase change cell, where it is present in a proportion typically providing between three and five full turns of twist in the thickness of the liquid crystal layer. In this instance, it is present in a proportion giving about 180° of twist, this amount being found a reasonable compromise in providing sufficient additive to give a significant improvement in contrast over the conventional dyed nematic without front polarizer, without introducing excessive hysteresis characteristic of a conventional phase change cell.

BRIEF DESCRIPTION OF THE DRAWING

Above-mentioned and other features and objects of this invention will become more apparent by reference to the following description taken in conjunction with the accompanying sole FIGURE which illustrates a section through a portion of the display device.

DETAILED DESCRIPTION OF THE PREFERRED EMBODIMENT

Referring to the drawing, a liquid crystal on silicon cell, which may be a dyed nematic on silicon cell with chiral additive, is constructed by forming an envelope for a layer 1 of liquid crystal by sealing together with an edge seal 2 a glass sheet 3 and a single crystal wafer of silicon 4. The edge seal 2 may be a plastic seal, thereby avoiding some of the alignment problems associated with the use of high temperatures used in the provision of glass frit edge seals. The glass sheet 3 is provided with an internal transparent electrode layer 5 which is covered with a transparent insulating layer 6 designed to prevent the passage of direct current through the cell. The silicon wafer 4 is provided with a matrix array of metal electrode pads 7 which is similarly covered with a transparent insulating layer 8. The exposed surfaces of the two insulating layers 6 and 8 are treated to promote, in the absence of any disturbing applied field, a particular alignment state of the adjacent liquid crystal molecules. Parallel homogeneous alignment is used if the chosen display mode is dyed nematic, in which case the nematic material may incorporate a chiral additive providing a twist of about 180° or the twist may be provided by appropriate relative orientation of the two alignment directions. Within the area defined by the edge seal the silicon wafer 4 is held spaced a precise distance from the glass sheet 3 by means of short lengths of glass fiber (not shown) trapped between the two adjacent surfaces so as to provide the liquid crystal layer with a uniform thickness of typically 10 to 12 microns. Beyond the confines of edge seal the silicon wafer 4 is provided with a small number of pads 9 by which external electrical connection may be made with the circuitry contained within the wafer.

The pads 7 are of contrasting color, typically some being red, some being blue, and others green. These colors may be provided by pigment incorporated into the pads themselves or into a layer covering the pads.

A display pel (picture element) is provided by the volume of the liquid crystal layer 1 that is sandwiched between an individual group of the matrix array of pads 7 and the transparent front electrode layer 5. The members of the group include pads of each of the contrasting colors. The actual number of pads 7 making up such a group depends upon the color rendering requirements of the display. In principle only three are necessary, a saturated red, a saturated blue, and a saturated green, in order to be able to display a full range of saturated colors. In practice, however, typical red, blue and green pigments are somewhat removed from the corners of the chromaticity diagram with the result that it is difficult to achieve saturation of the intermediate colors yellow, magenta and cyan, and for this reason it may be preferred to use more than three pads for this pel, incorporating for instance a fourth member of the group which is colored yellow.

When the number of pads forming the group of a single pel is four, these four pads can be conveniently arranged either in a two-by-two matrix of substantially square pads or in a four-by-one array of rectangular pads having an aspect ratio in the region of 4:1. Similarly, when there are only three pads to the group these can be arranged in a tesselated L-shaped grouping of square pads or in a three-by-one array of rectangular pads. An advantage of the single line arrangement is that, depending upon the method used for the application of the pigment, it can simplify the construction of the display since the pigment can then extend in stripes extending from top to bottom of the display area or from side to side across its width.

The guest dye of the liquid crystal is black and so if none of the pads of a pel is activated, that is, none is set to a potential different from that of the front electrode, the pel will appear black. Activation of a single pad will go part or substantially all the way to removing the black from the region of the liquid crystal layer registering with that pad and thus its color begins to stand revealed. If two or more of the pads of a pel are simultaneously activated, the color that is revealed is determined additively from a summation of the colors revealed by its component pads.

For low resolution displays having pads with linear dimensions in excess of 0.5 mm the various pigments may be applied by screen printing using inks which are subsequently baked to remove the binder and thereby keep the thickness low. This technique has previously been described in a paper by T. Uchida, entitled "A Liquid Crystal Multicolor Display Using Color Filters," Proceedings of the First European Display Research Conference, pages 39-42 (1981).

For pads of smaller dimensions alternative techniques are used. A photolithographic technique can be used employing resists that contain the requisite pigments. A resist incorporating one of the pigments is applied to the silicon wafer and is selectively exposed to cross-link the resist in the regions registering with the requisite pads. Then the unexposed regions are removed by washing before proceeding to recoat the wafer with the next resist incorporating a different pigment. Finally, when all of the resists have been applied and selectively exposed, the wafer is baked to drive off the resist binder and leave the pigment bound to the underlying surface. Alternatively, if the resist is compatible with the liquid crystal mixture 1, the final baking is dispensed with and instead the unbaked resist is used as the alignment layer dispensing with the use of an insulating layer 8 and employing for instance a cloth to rub the surface of the resin to provide the requisite molecular aligning properties.

Alternatively, particularly when using aluminum to form the pads, a pigment can be incorporated into them by selective anodization. For this purpose a pigment is incorporated into an anodizing solution and selected pads are anodized, either by using photolithography to mask the non-selected pads from the anodization, or by confining the anodization to the selected pads by activating those pads, only, while leaving the others at the cathode potential. The process is then repeated the requisite number of times using different pigments in the anodizing solutions and selecting different sets of pads. Under appropriate anodizing conditions the pigment becomes firmly embedded in the pores of the anodized material.

While we have described above the principles of our invention in connection with specific apparatus, it is to be clearly understood that this description is made only by way of example and not as a limitation to the scope of our invention as set forth in the accompanying claims.

We claim:

1. A reflected light liquid crystal display device capable of exhibiting polychromatic images, comprising
   a transparent front sheet having an inner surface on which a transparent electrode is located;
   a silicon wafer layer spaced apart from the transparent front sheet and having an inner surface facing the transparent electrode;
   a matrix array of separate metal electrode pads arranged in groups located on the inner surface of the silicon wafer layer, the inner surface of each separate pad of a group displaying a different one of a plurality of primary colors;
   a liquid crystal layer sandwiched between the transparent electrode and the metal electrode pads and including a plurality of regions which are capable of assuming either one of a translucent or opaque state depending on the potential difference between the front electrode and the respective electrode pad; and
   means for selective activation of the electrode pads of every group to cause a potential difference between the transparent electrode and the electrode pad so that the respective liquid crystal layer region overlying the activated pad will enter the translucent stage thereby revealing the color of the electrode pad, a plurality of the revealed electrode pads of a group forming a picture element of the respective polychromatic image, so that the color revealed by the picture element is determined by the cumulative effect of the colors of the activated pads in the group.

2. The liquid crystal display device according to claim 1, wherein each group of pads comprises one red, one green and one blue member.

3. The liquid crystal display device according to claim 1 wherein each group of pads comprises one red, one green, and one blue and one yellow member.

4. The liquid crystal display device according to claim 1 further comprising a black dye incorporated in the liquid crystal layer.

5. The liquid crystal display device according to claim 1 further comprising covering layers on the surfaces of the pads which, in groups, display the colors.

* * * * *